US006585596B1

United States Patent
Leifer et al.

(10) Patent No.: US 6,585,596 B1
(45) Date of Patent: Jul. 1, 2003

(54) WIRELESS GAME CONTROL UNITS

(75) Inventors: Alan E. Leifer, Dix Hills, NY (US); Richard Leifer, Melville, NY (US); Chi-Fu Peng, Chung Li (TW)

(73) Assignee: Arista Enterprises Inc., Hauppauge, NY (US)

( * ) Notice: Subject to any disclaimer, the term of this patent is extended or adjusted under 35 U.S.C. 154(b) by 0 days.

(21) Appl. No.: 09/708,195

(22) Filed: Nov. 8, 2000

Related U.S. Application Data

(63) Continuation-in-part of application No. 09/092,489, filed on Jun. 5, 1998, now Pat. No. 6,280,327, which is a continuation-in-part of application No. 09/023,813, filed on Feb. 13, 1998, now abandoned.

(51) Int. Cl.[7] .............................................. A63F 13/06
(52) U.S. Cl. ............................ 463/39; 463/36; 345/156
(58) Field of Search .................. 273/148 B; 463/36–39, 463/47; 345/156, 158, 161

(56) References Cited

U.S. PATENT DOCUMENTS

| | | | |
|---|---|---|---|
| 4,151,407 A | * 4/1979 | McBride et al. | 250/199 |
| 4,531,740 A | * 7/1985 | Green et al. | 273/148 B |
| 4,754,268 A | * 6/1988 | Mori | 340/710 |
| 4,924,216 A | * 5/1990 | Leung | 340/709 |
| 5,098,110 A | * 3/1992 | Yang | 273/438 |
| 5,435,573 A | 7/1995 | Oakford | |
| 5,451,053 A | * 9/1995 | Garrido | 273/148 B |
| 5,605,505 A | 2/1997 | Han | |
| 5,613,190 A | * 3/1997 | Hylton | 455/3.1 |
| 5,759,100 A | * 6/1998 | Nakanishi | 463/37 |
| 5,796,387 A | * 8/1998 | Curran et al. | 345/158 |
| 5,806,849 A | * 9/1998 | Rutkowski | 273/438 |
| 5,874,944 A | * 2/1999 | Khoury | 345/161 |
| 5,881,366 A | * 3/1999 | Bodenmann et al. | 455/66 |
| 5,935,224 A | * 8/1999 | Svancarek et al. | 710/63 |
| 5,984,785 A | * 11/1999 | Takeda et al. | 463/38 |
| 5,986,644 A | * 11/1999 | Herder et al. | 345/158 |
| 5,999,798 A | * 12/1999 | Yang | 455/66 |
| 6,008,777 A | * 12/1999 | Yiu | 345/2 |
| 6,022,274 A | * 2/2000 | Takeda et al. | 463/44 |
| 6,078,789 A | * 6/2000 | Bodenmann et al. | 455/66 |
| 6,132,315 A | * 10/2000 | Miyamoto et al. | 463/43 |
| 6,144,367 A | * 11/2000 | Berstis | 345/158 |

* cited by examiner

*Primary Examiner*—Valencia Martin-Wallace
*Assistant Examiner*—Scott E. Jones
(74) *Attorney, Agent, or Firm*—Keusey, Tutunjian & Bitetto, P.C.

(57) ABSTRACT

A wireless control unit includes a controller having wireless transmitter circuitry for transmitting game information, and a console interface/adapter for converting one of the communication ports of the game console into a wireless receiver/transmitter. The console interface/adapter also includes an additional communication port so as to provide the user with access to the used communication port while the interface/adapter is operably disposed within the communication port of the game console.

31 Claims, 13 Drawing Sheets

WIRELESS GAME CONTROL UNITS

CROSS REFERENCE TO RELATED APPLICATIONS

This application is a continuation-in-part of U.S. patent application Ser. No. 09/092,489 filed Jun. 5, 1998, now U.S. Pat. No. 6,280,327, which is a continuation-in-part of U.S. patent application Ser. No. 09/023,813, filed Feb. 13, 1998, now abandoned.

FIELD OF THE INVENTION

The present application generally relates to electronic device controllers. More particularly, it relates to wireless electronic device control units.

DESCRIPTION OF THE RELATED ART

Home video game systems generally have a game console coupled to a television monitor and one or more game controllers connected to the console which permit user interaction with a game being played. Most video game systems are sold with game controllers that are connected to the console through a hard-wire link. More recently, wireless game controller accessories have been developed which provide players with more freedom of movement. Such wireless controller accessories replicate the basic control features found on conventional hard-wired controllers but use infrared (IR), radio frequency (RF) or other electromagnetic radiation to send signals to the console.

To operate the video game system, a user (or player) inserts a game program which may be stored in a game cartridge or on a compact disc into the console and typically depresses a start switch to begin play of the particular game programmed into the cartridge or on the compact disc. As a game is played, a player or players control various visual aspects of the game using either the hard-wired or wireless controllers. For example, certain video games allow players to maneuver persons or aliens over various types of terrain, through tunnels, under water and over other various obstacles in order to score points. Some of these video games allow players to fly planes, helicopters, tanks and the like to attack various installations and score points. Other video games allow players to maneuver a person and to fire weapons at program generated images or at images of a person controlled by another player.

To allow players to continuously fire a weapon some conventional hard-wired video game systems include an auto fire function. In the hard-wired systems, the auto fire function can be activated by a single switch or the activation of a sequence of switches on the game controller. Activation of the auto fire function causes the game controller to continuously send to the game console a fire signal which results in the continuous firing of one or more game weapons.

Some current wireless game controllers include a power save (or sleep) function intended to conserve battery power when the controller is not in use for a predetermined period of time. The sleep function was mainly developed to conserve battery power when a controller's power switch is inadvertently left on after a player finishes playing a game. The sleep function automatically monitors the activity of the controller switches and turns off the power to the internal circuits of the controller after a predetermined period of time elapses without any switches on the controller being actuated.

However, since certain current wireless game controllers include the sleep function it is impractical to also include the auto fire function because if the auto fire function is activated and a user stops playing a game but fails to turn the controller power switch off, the auto fire function will continue to function so that the controller continues to generate and send the fire signal. The fire signal would then be detected by the sleep circuitry so that the sleep function does not activate and the controller would continue to draw battery power to generate and send the fire signals.

SUMMARY OF THE INVENTION

The present application provides various embodiments of wireless game control units that provides an auto activate function that is activated by a controller in the game control unit and maintained by a console interface in the game control unit.

In one embodiment, the wireless control unit includes a controller having at least one user operable switch and wireless transmitter circuitry for transmitting game information, including an auto fire start signal, and a console interface having wireless receiver circuitry for receiving the game information, including an auto activate start signal, from the controller and for modifying the game information so that an activate signal is continuously sent from the console interface to the console and at least one object, such as a weapon, in a game being played with the video game system is continuously activated.

In an alternative embodiment, the wireless control unit can be configured for multiple player operation. The control unit includes a plurality of controllers each having at least one user operable switch and wireless transmitter circuitry for transmitting game information, including an auto activate start signal, and at least one console interface having wireless receiver circuitry for receiving the game information, including the auto activate start signal, from each of the plurality of controllers and for selectively modifying the game information from each controller so that when the auto activate start signal is received at least one fire signal is continuously sent from the console interface to the console and at least one object, such as a weapon, in a game being played with the video game system is continuously activated. The console interface can also include at least one connection port to receive at least one memory cartridge for storing game information associated with a game being played with each controller.

The present application also provides a video game system that includes a game console, a controller having at least one user operable switch and wireless transmitter circuitry for transmitting game information, including an auto activate start signal, and a console interface connectable to the game console and having wireless receiver circuitry for receiving the game information, including the auto activate start signal, from the controller and for modifying the game information so that an activate signal is continuously sent from the console interface to the console and at least one weapon in a game being played with the video game system is continuously activated. The video system may also include a connection port for receiving a memory cartridge that stores game information.

BRIEF DESCRIPTION OF THE DRAWINGS

In the drawings wherein like reference numerals denote similar elements throughout the views.

DETAILED DESCRIPTION OF THE PREFERRED EMBODIMENTS

Figure 1:
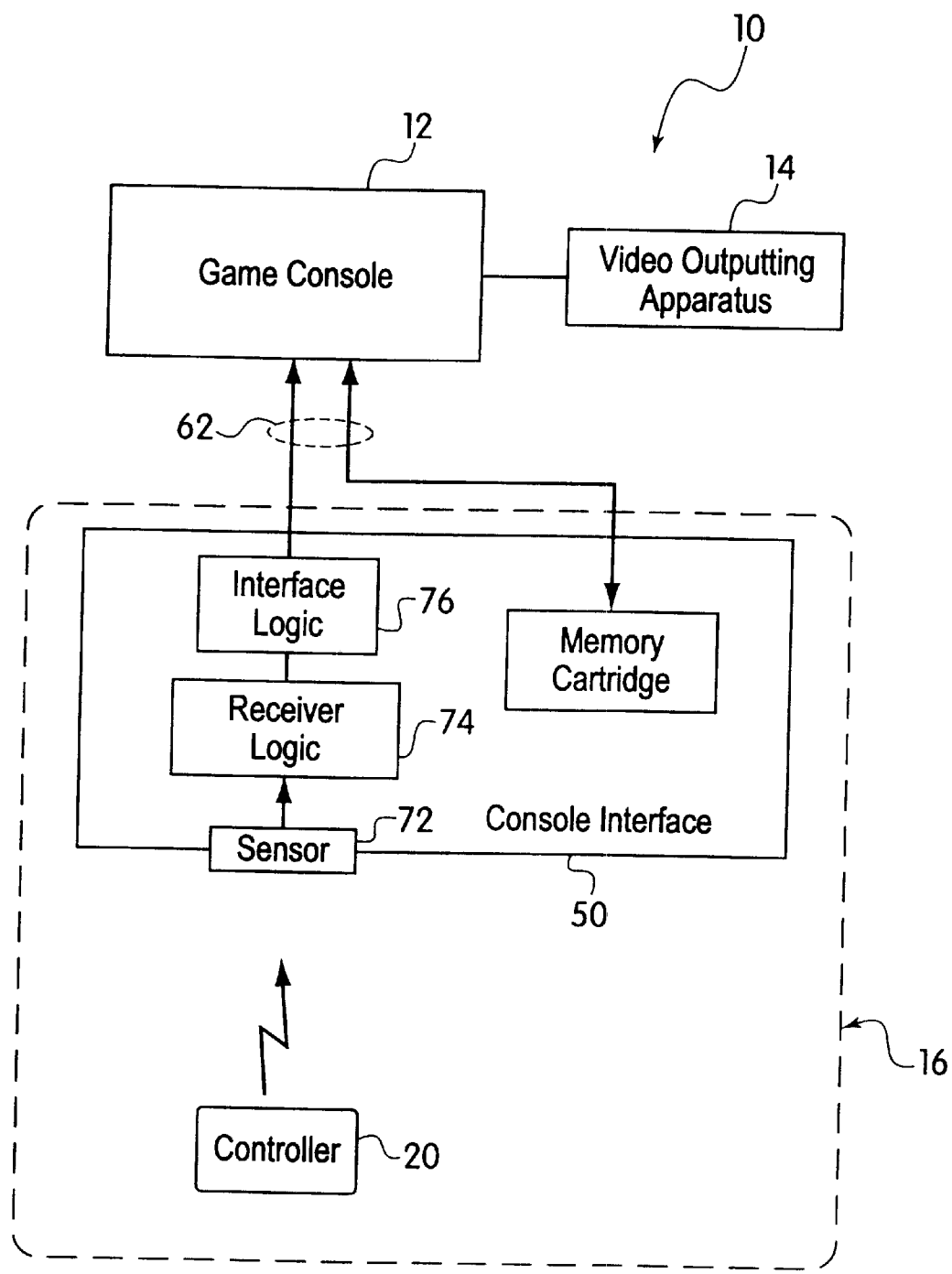
FIG. 1 is a block diagram of a video game system incorporating a wireless controller unit according to the present invention.

The present application provides a wireless control unit for video game systems that provides an auto fire function that does not interfere with the proper operation of a sleep function incorporated into the wireless control unit. Preferably, the wireless control unit transfers game information by infrared (IR) transmissions. However, other known electromagnetic radiation techniques, such as radio frequency (RF) transmissions, may be employed. In accordance with other embodiments (to be discussed later), the combined use of IR and RF wireless communication protocols provides superior communication results between a game controller and a game console. Referring to FIG. 1, an exemplary embodiment of a video game system incorporating the wireless control unit of the present application is shown. In this embodiment, the video game system 10 includes a game console 12, a video outputting device 14, such as a television monitor, and the wireless control unit 16.

The game console 12 includes a housing having at least one controller (or game) connection port and a game cartridge port. A game cartridge has a video game program stored therein. Alternatively, the console 12 may include a disc drive mechanism in which a disc, such as a compact disc, has stored thereon a video game program.

The game console 12 also includes known circuitry for executing the video game program stored in the cartridge or on disc. For example, the console may include a processor, memory and stored system programs for controlling the operation of the console, controller interface circuitry, and audio/video generating and outputting circuitry. An example of suitable game consoles are included in the Nintendo N64®, SEGA Genesis and Sony Playstation™ and Playstation II™ game systems. In the video game system 10 according to this embodiment of the present invention, the console 12 is connected to a video outputting apparatus 14 via a direct wire link. Further, the wireless control unit 16 can be connected to the console by, for example, a direct wire link or by mating connectors.

Figure 2:
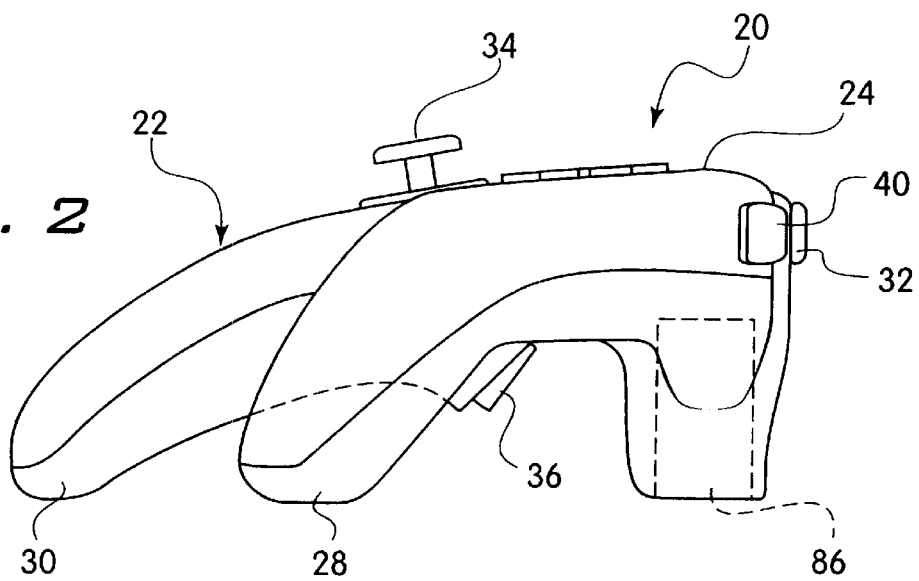
FIG. 2 is a side-elevational view of a controller for the wireless control unit 10 according to the present application.
Figure 3:
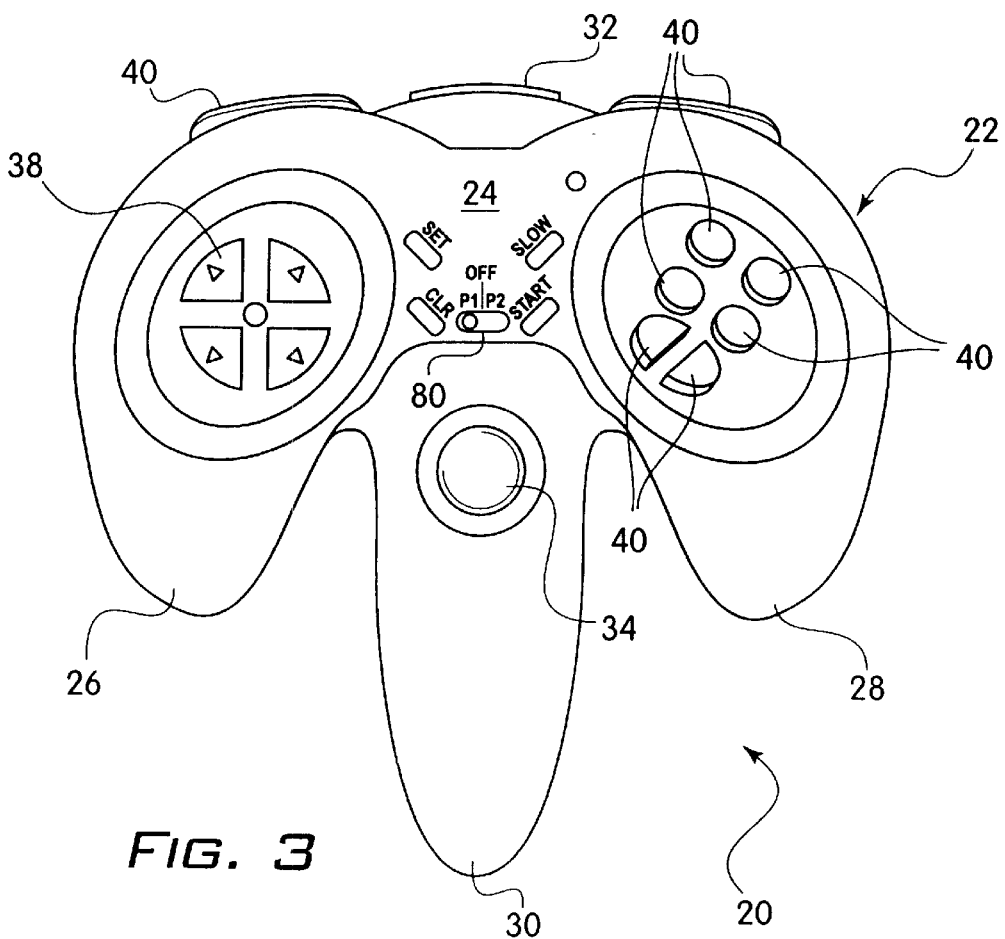
FIG. 3 is a top view of the controller of FIG. 2.
Figure 4:
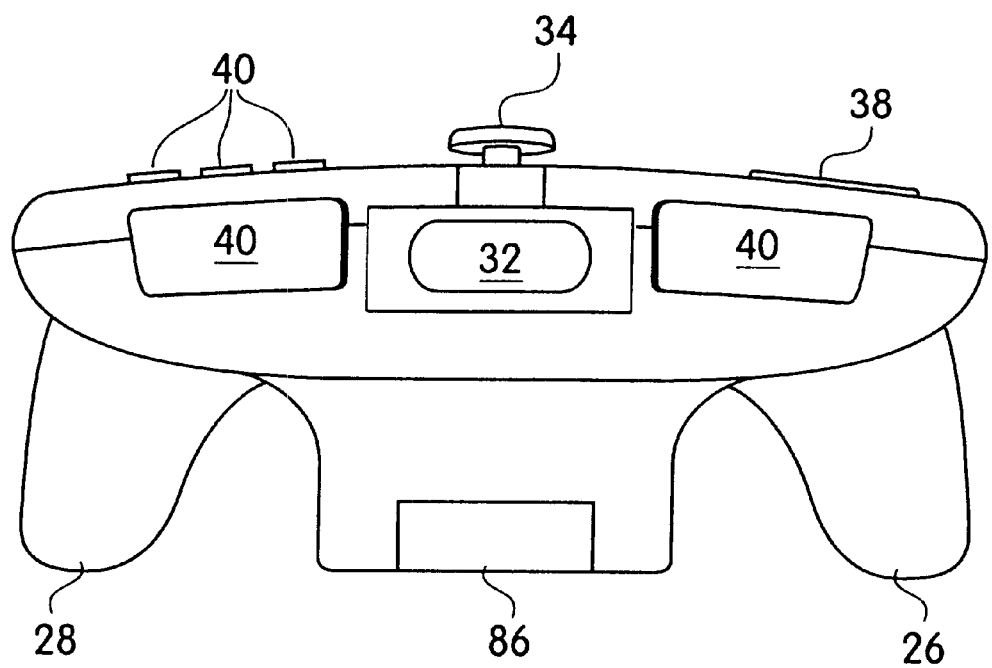
FIG. 4 is a front elevational view of the controller of FIG. 2.

Referring generally to FIGS. 1–4, the wireless control unit 16 according to one embodiment of the present application includes a controller 20 and a console interface 50. As seen in FIGS. 2–4, the controller 20 has a housing 22 defined by a control section 24, left and right side handles 26, 28 extending out from the control section 24 and then angled downwardly, and a center handle 30 extending from a center portion of the control section 24. Since in this embodiment signals are transmitted from the controller 20 to the console interface 50 via infrared, the housing 22 preferably includes a transmission window 32 for emitting infrared signals. However, if the transmission of control information from the controller 20 to the console interface 50 is by other electromagnetic radiation techniques then a transmission window may not be necessary. A plurality of user activated switches 40 are mounted to the housing 22 and accessible from outer surface portions of the housing 22. The controller 20 also includes a battery (not shown) that supplies power to the internal components of the controller.

Typically, a player grips the center handle 30 and one of the side handles 26, 28 during play and operates the switches corresponding to the handles gripped. A player may also grip the left and right side handles 26, 28, where rocker switch 38 and push-button switches 40 are the user activated switches. Rocker switch 38 can be used for two or three dimensional movement of an object controlled by the controller 20 and push-button switches 40 can be used for performing control functions associated with the object. Further, the orientation of the switches 40 and the three handle configuration of the controller 20 also facilitates single handed as well as two handed gripping and operation of the controller by a player. For single handed gripping and operation, a player can grip the center handle 30 and joystick 34 and trigger switch 36 are the user activated switches, Joystick 34 can be used for two or three dimensional movement of an object controlled by the controller 20, and trigger switch 36 can be used for performing at least one control function associated with the object. In this embodiment, trigger switch 36 is typically used to fire weapons during a game.

Figure 5:
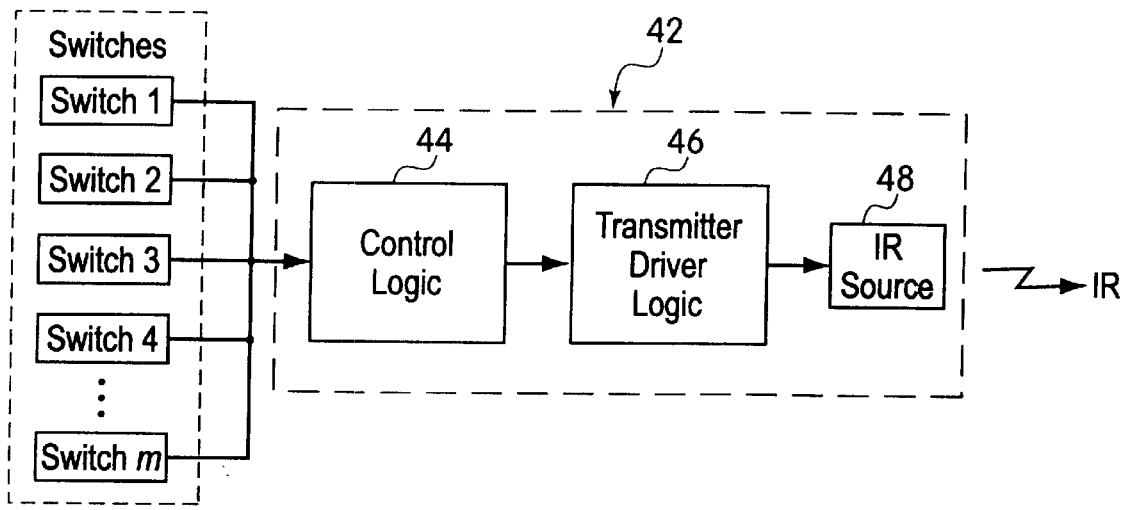
FIG. 5 is a block diagram of transmitter circuitry for the controller of FIG. 2.

Referring to FIG. 5, the controller 20 also includes transmitter circuitry 42 operatively connected to the various switches, which receives game information from the switches, formats the game information into, for example, bit streams for wireless transmission, and transmits the game information to the console interface 50. The transmitter circuitry 42 includes control logic 44, transmitter driver logic 46 and at least one transmitter source 48. The control logic 44 receives the game information from the various switches, and encodes the game information into, for example, a serial bit stream which is suitable for wireless transmission preferably by infrared. The bit stream may be configured such that one or more bits in the stream represents one switch on the controller 20. The transmitter circuitry 46 receives the bit stream from the control logic 44 and amplifies (if necessary) and modulates the bit stream at a predefined frequency band (e.g., 38 kHz) to energize at least one infrared source 48 (e.g., an LED) which emits infra-red signals.

To conserve battery power in the controller, the control logic 44 can be configured control battery power to the internal components of the controller and to monitor the activation of the switches and if none of the switches are activated for a predetermined period of time, e.g., about 2 minutes, the control logic shuts off the battery power to the internal circuits of the controller. This function is also known as a sleep function.

Figure 6:
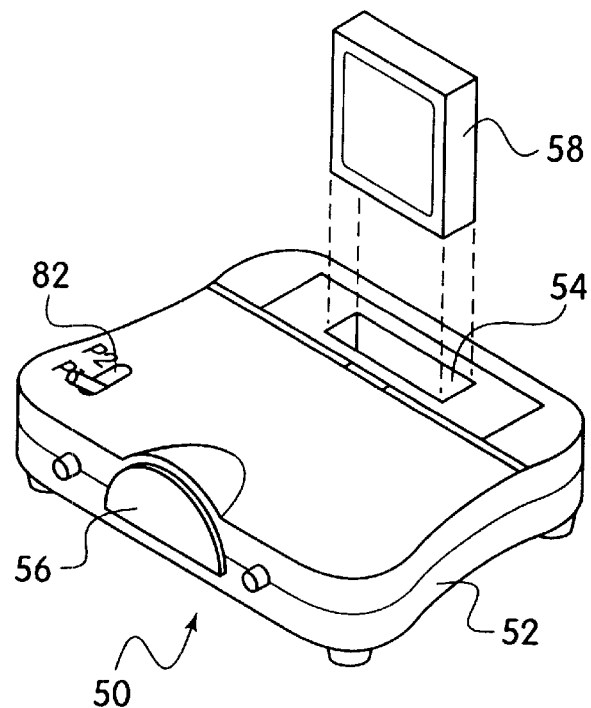
FIG. 6 is a perspective view of a console interface for the wireless control unit 15 according to the present invention.
Figure 7:
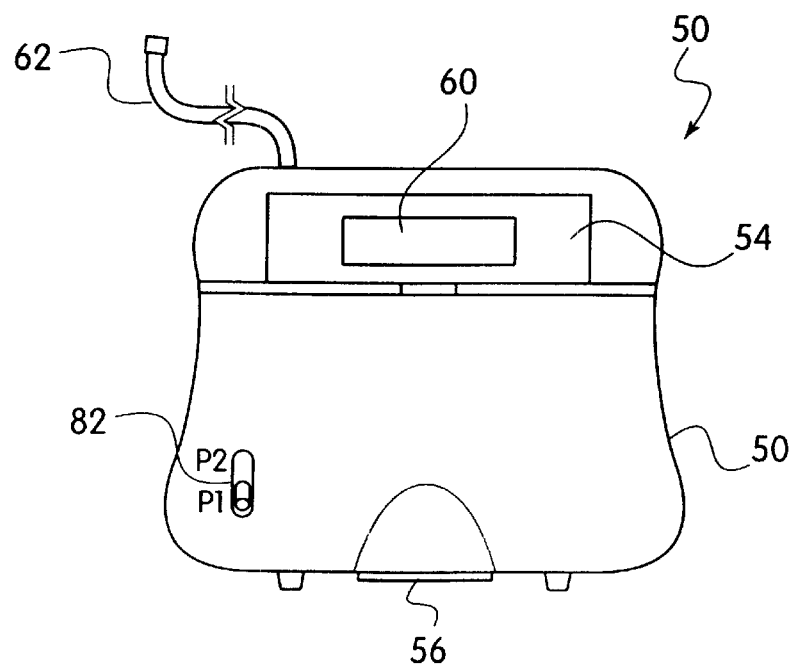
FIG. 7 is a top view of the console interface of FIG. 6.

Referring now to FIGS. 6 and 7, the console interface 50 has a housing 52 that includes a cartridge port 54 and, if necessary, a transmission window 56 for receiving the infra-red transmissions from the controller 20. The cartridge port 54 is configured to receive a memory cartridge (or memory card) 58 and includes a connector 60 that connects to a connector in the memory cartridge. An example of a suitable memory cartridge is the N64® CONTROLLER PAK™ manufactured by Nintendo. A cable 62 extending from the console interface 50 includes a connector 63 adapted to be connected to the game console 12. In one embodiment, connector 63 is coupled to a game controller port on the game console. Alternatively, communication ports other than the game controller ports of the game console may be used to connected the console interface to the game console.

Game information from the controller 20 and game condition information saved on the memory cartridge 58 are transferred to the game console 12 for subsequent processing via cable 62 or a connector extending from the console interface. In addition, when a player wants to end a game, the player can instruct the game console 12 to save the current game conditions in the memory cartridge 58 in the interface console.

Figure 8:
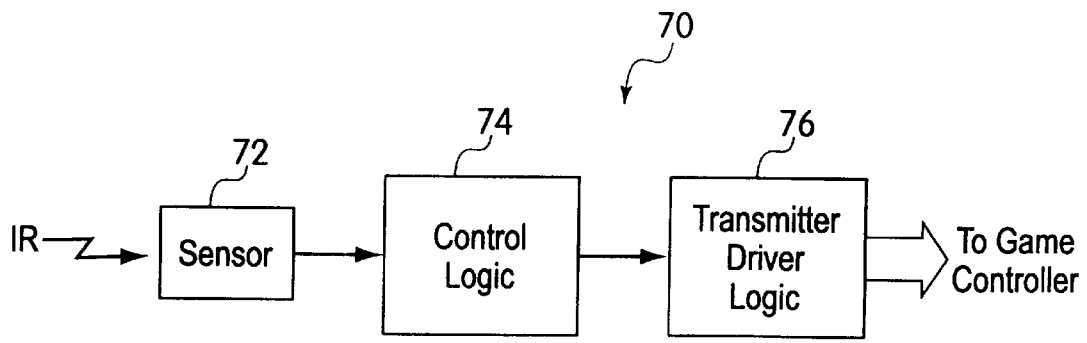
FIG. 8 is a block diagram of receiver circuitry for the console interface of the wireless controller unit.

Referring to FIG. 8, the console interface 50 also includes receiver circuitry 70 that receives the transmitted bit stream, extracts the game information from the bit stream, formats the game information into a form suitable for processing by the game console 12, and transfers the game information to the game console 12. More particularly, in an IR embodiment, the receiver circuitry 70 includes a sensor 72, such as a photosensitive transistor, which receives the infra-red signals from the controller 20, and receiver logic 74 that amplifies the received bit stream, demodulates the amplified bit stream and decodes the game information from the bit stream. Console interface logic 76 then formats the game information for transfer to the game console 12 via, for example, cable 62 (FIG. 7). In a contemplated RF embodiment, sensor 72 would be an RF antenna.

As noted, the auto activate function in hard-wired systems is actuated and 20 generated at the controller so that the controller continuously sends an activate signal to the game console. In the wireless control unit according to the present application, the controller 20 sends an auto activate start signal which is included in the bit stream to the receiver circuitry 70, which decodes the game information from the bit stream. The console interface logic 76 also monitors the bit stream for the auto activate start signal, and when it is detected in the stream the console interface automatically includes in the game information to be transmitted to the game console 12 an activate signal so that one or more objects, such as weapons, in the game being played and controlled by the controller is continuously activated. The console interface logic 76 continues to insert the activate signal into the game information signals sent to the game console 12 until the receiver circuitry 70 detects auto activate stop signal from the controller. When auto activate stop signal is detected by the receiver circuitry 70 the receiver circuitry stops inserting the activate signal into the game information sent to the game console 12.

By having the controller 20 send a signal to start the auto activate function in the console interface 50 to continuously provide the activate signals to the game console 12, the auto activate function does not prevent the activation of the sleep function in the controller. That is, the controller 20 of the wireless control unit according to the present application does not continuously send the activate signals when the auto activate function is active and therefore, the sleep circuitry in the controller does not continuously detect the auto activate start signal even after a player has stopped playing a game but has inadvertently left the controller power switch on.

The embodiment discussed above for the controller and console interface is for single player applications. For single player applications the controller 20 and the console interface 50 are pre-configured to transmit and receive the bit streams at one frequency band, e.g., 100 KHZ using one data coding scheme. However, many game programs executed by the game console permit multiple players to play at one time. For multiple player applications, a plurality of controllers 20 and either a single console interface 50 having receiver circuitry 70 to receive game information from the plurality of controllers (FIG. 9), or a plurality of console interfaces in one to one correspondence with the plurality of controllers (FIG. 10) are used. In either configuration, the game information transmitted from a controller 20 to its corresponding receiver circuitry 70 is differentiated from game information transmitted from other controllers 20 to their corresponding receiver circuitry 70 so as to avoid cross-talk between the controllers. To achieve this, the controller 20 and console interface 50 for each player may be configured to transmit and received the bit streams at the same frequency band but the frequency band for each controller and corresponding receiver circuitry is different. Alternatively, each controller may transmit the game information at the same frequency but the data coding scheme used by each controller and corresponding receiver circuitry is different. To select the operational frequency band or data coding scheme for the controller 20 and corresponding receiver circuitry 70 for each player, player select switches are provided. In an exemplary embodiment for two players in which the frequency band used is different for each player, the controller 20 includes player select switch 80, seen in FIG. 3, which allows a player to select a frequency band for player 1 (P1) or player 2 (P2) operation. Similarly, player select switch 82 on the console interface 50, seen in FIG. 7, allows the player to select a frequency band for player 1 (F1) or player 2 (P2) operation. In this embodiment, by selecting player 1 on the controller 20 and the console interface 50, the controller is set to transmit and the console interface to receive at one operational frequency band, for example, about 38 KHZ. By selecting player 2 the controller is set to transmit and the console interface to receive at another operational frequency band, for example, about 100 KHZ.

For multiple player applications, the transmitter driver logic 44 of the controller 20, seen in FIG. 5, is modified to be able to transmit the bit stream at different frequencies which can be selected by the player select switch 80. Similarly, the receiver logic 74 of the console interface 50, seen in FIG. 8, is modified to receive bit streams at different frequencies. Such receiver logic may include for example a band pass filter which sets the frequency band for receiving the bit stream before the stream is demodulated. More detailed descriptions of the transmitter and receiver circuitry can be found in U.S. Pat. Nos. 5,435,573 and 5,605,505, both of which are incorporated herein in their entirety by reference.

Figure 9:
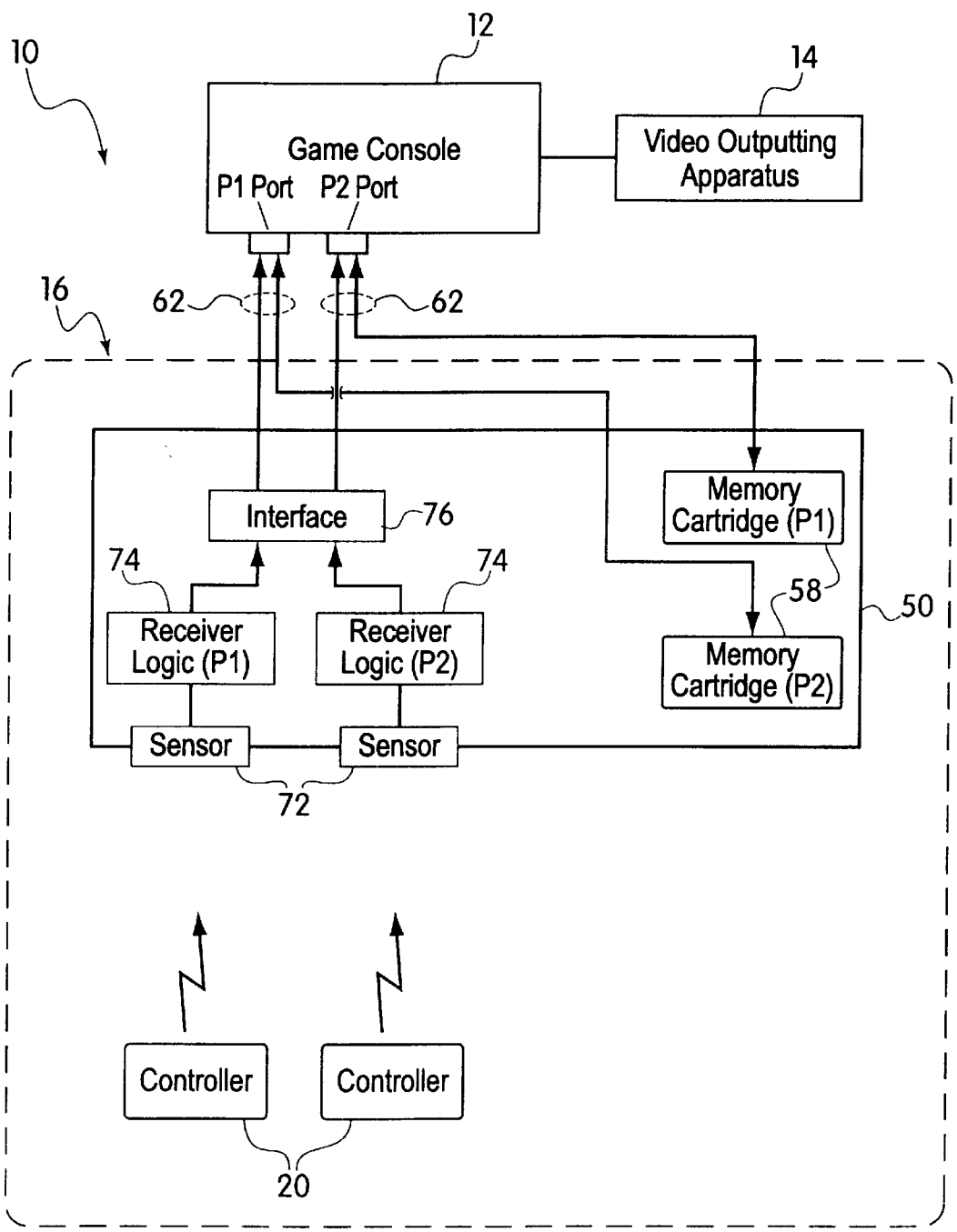
FIG. 9 is a block diagram of an alternative embodiment for the wireless control 20 unit according to the present invention, illustrating a console interface which supports multiple player use of the system.
Figure 10:
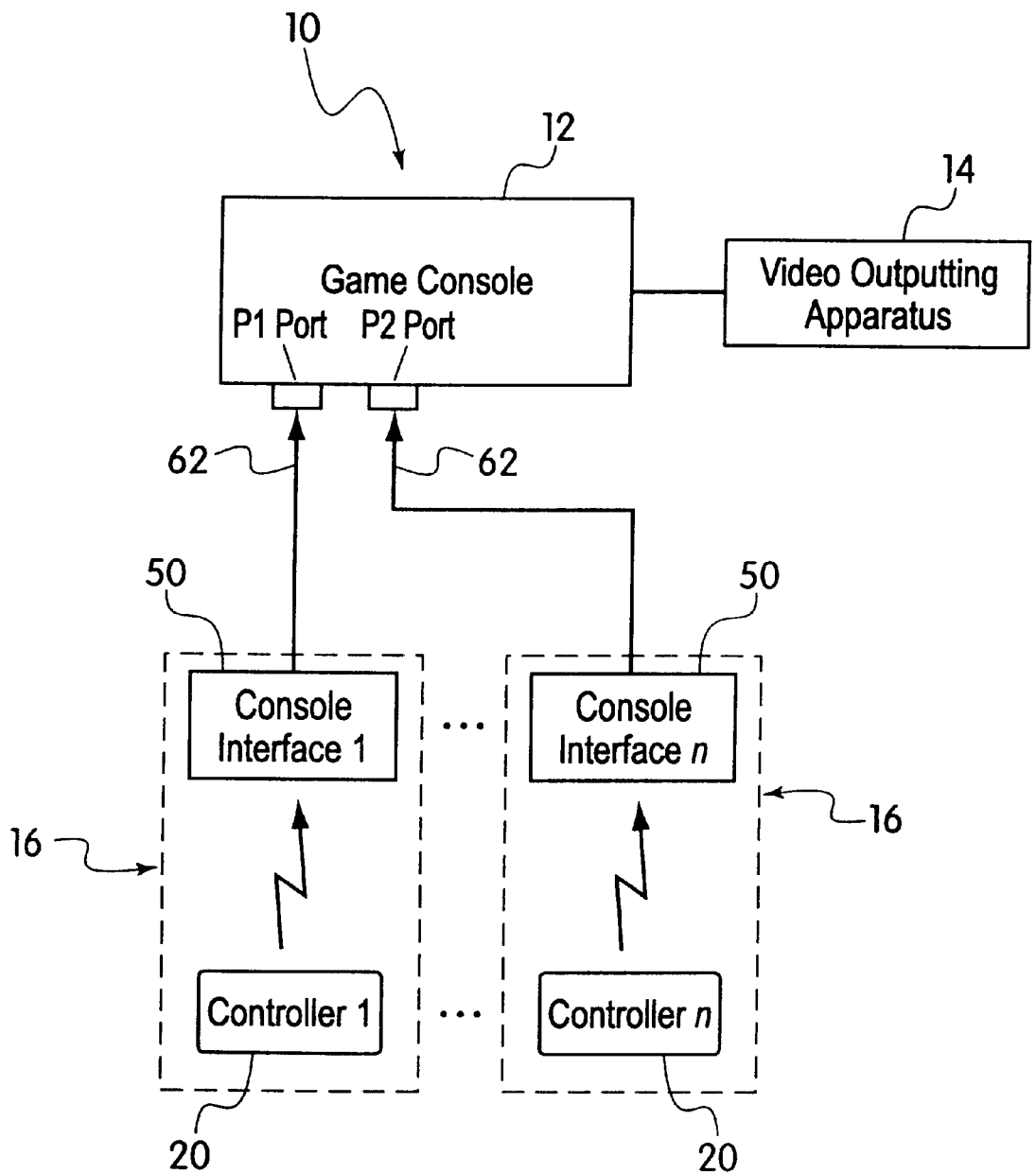
FIG. 10 is a block diagram of an alternative embodiment for the wireless control unit according to the present invention having separate console interfaces which support multiple player use of the system.

As noted, an alternative embodiment for the wireless control unit 16 is shown in FIG. 9. In this embodiment, the console interface 50 includes a plurality of sensors 72 and a plurality of corresponding receiver logic blocks 74 each block being reconfigured to receive bit streams at one frequency band. FIG. 9 shows two sensors 72 and two corresponding receiver logic blocks 74 which are used to separately receive game information from two controllers 20 for two player operation. However, the present application contemplates using more than two controllers so that more than two sensors and corresponding receiver logic blocks may used for more than two players.

In this embodiment, in order to allow each player to save his own game information, multiple memory cartridges 58 may be used, one for each player. However, a single memory cartridge may also be used to store game information for every player. Data transfers between each memory card and the game console would be by separate cables 62 (or connectors) connected to the player port on the game console.

Figure 11:
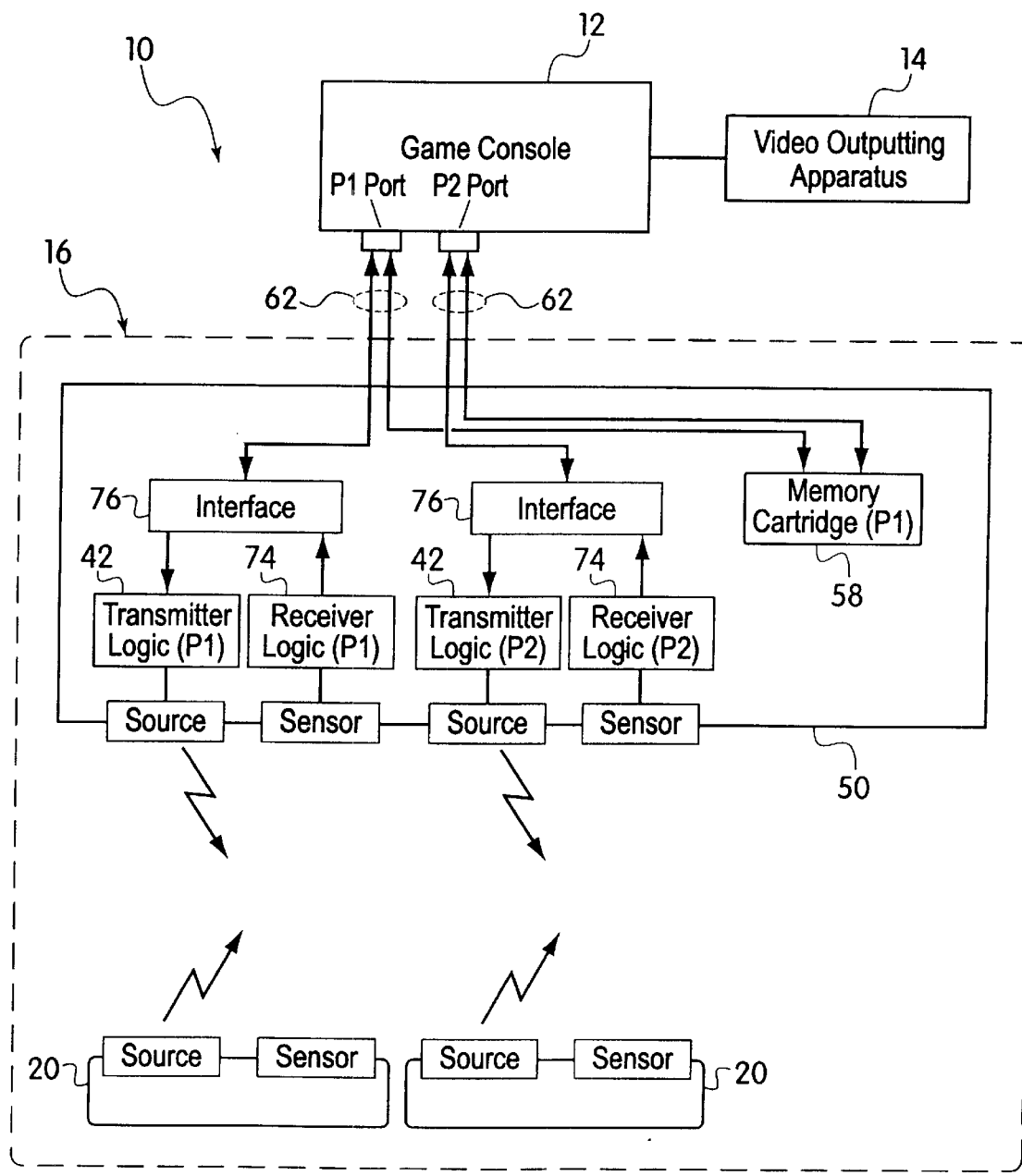
FIG. 11 is a block diagram of another alternative embodiment of the wireless controller unit for bidirectional communication between the controller and the console interface.

Referring now to FIG. 11, an another alternative embodiment of the wireless control unit 16 according to the present invention is shown. In this embodiment, the controller 20 and the console interface 50 are configured for bidirectional wireless communication. For bidirectional wireless communication, the controller 20 and the console interface 50 both would include the transmitter logic 42 (shown in FIG. 5) and the receiver logic 70 (shown in FIG. 8). As discussed above, the transmitter and receiver circuitry for each player playing a game would operate at different frequency bands (or use different coding schemes). Information transmitted from the controller to the console interface includes game information, and information from the console interface to the controller includes information to, for example, reconfigure the functions of the switches and information that provides interaction between the controller and a game being played. The information from the console interface to the controller is collectively defined as controller information. Thus, the controller can include a connection port 86 (seen in FIGS. 2 and 4) for connecting different peripheral devices to the controller which are responsive to the controller information transmitted by the console. Such peripheral devices include memory cartridges, vibrating members (e.g., a rumble pack), and other devices that can respond to controller information transmitted by the console. To illustrate, the vibrating mechanism can be excited at times during play which coincide with certain conditions of the game, such as during a crash. When a crash occurs, the console sends an information signal to the controller to energize the vibrating member so that the entire controller vibrates and the vibrations are felt by the player. A suitable vibrating member is the Rumble Pak™ manufactured by Nintendo.

In addition, FIG. 11 also illustrates using a single memory cartridge for storing the game condition information for each player at one time. However, as noted above multiple memory cartridges may also be used. Further, in this embodiment gun controllers which require bidirectional communication with the game console can be substituted for the controller 20. Such gun controllers would include the transmitter and receiver circuitry discussed above and information transfers would operate in a similar manner as described above.

In the two player embodiments, each controller 20 in the wireless control unit according to the present application can send an auto fire start signal which is included in the bit stream to the corresponding receiver circuitry 70 which decodes the game information from the bit stream. Similar to the above-described embodiments, the console interface logic 76 for each controller monitors the bit stream for the auto activate start signal, and when it is detected in the stream, the console interface logic automatically inserts an activate signal into the game information to be transmitted to the game console 12 so that one or more objects, such as weapons, in the game being played is continuously activated. The console interface logic 76 for each controller 20 which sends the auto activate start signal continues to insert the activate signal into the corresponding bit stream until the receiver circuitry 70 detects an auto activate stop signal for the corresponding controller 20. When auto activate stop signal is detected by the receiver circuitry 70, the receiver circuitry stops inserting the activate signal into the game information sent to the game console 12.

As noted above, by having the controller 20 send a information to start the auto activate function and the receiver circuitry 70 in the console interface 50 to continuously provide the activate signals to the game console 12, the auto activate function does not prevent the activation of the sleep function in the controllers. That is, the controllers 20 of each wireless control unit according to this embodiment does not continuously send the activate signals when the auto activate function is active and the sleep circuitry in each controller does not continuously detect the auto activate start signal even after a player has stopped playing a game but has inadvertently left the controller power switch on.

Figure 12:
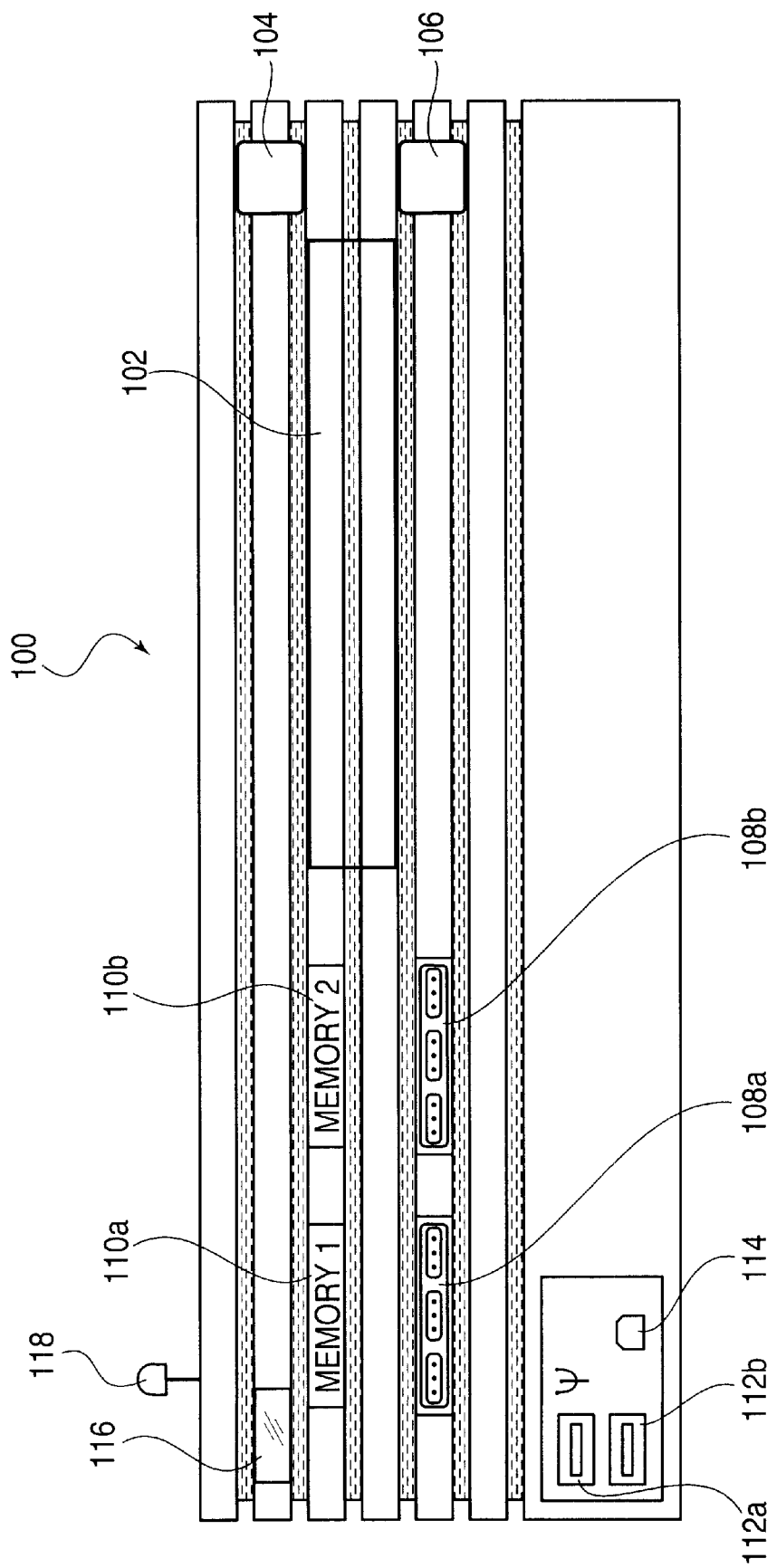
FIG. 12 is a diagrammatic representation of a game console in accordance with an embodiment of the invention.

FIG. 12 shows a video game console 100 according to an embodiment of the invention. Console 100 includes a power on/off/reset button 104 and a door open button 106 for controlling access to the media tray 102. Game controller ports 108a and 108b are provided for receiving wired game controllers and include corresponding memory slots 110a and 110b for providing the user with the ability to add memory to the system. Console 100 also includes other communication ports, such as, for example, universal serial bus (USB) ports 112a and 112b and an IEEE 1394 FireWire™ port 114. Console 100 may also include an IR window 116 and an RF antenna 118 and corresponding circuitry which enables console 100 to communicate with a wireless controller via IR, RF or a combination of both. It is also contemplated that other communication ports such as a fiber optic port, PCMCIA slots, and broadband high speed communication ports may also be incorporated into the game console. Those of skill in the art recognize that such other ports are within the scope of this disclosure and the console interface may be operatively configured for such ports.

Console 100 and similar video game consoles, such as, for example. The SONY Playstation II™ are advancing to the point where they are no longer dedicated video game playing devices. This means that console 100 is now capable of playing other media, such as Digital Video (Versatile)

Discs (DVD). These DVD type gaming consoles will likely include and IR receiver 116 or RF receiver 118 adapted to receive remote control codes for the DVD functions of the console and not primarily for wireless game controllers. Although these receivers could be used for receiving wireless controllers, they do not include wireless transmitters for transmitting information to the wireless controllers. This information can include, but is not limited to, controlling internal vibration members of the game controller, programming the controller, etc. As such, there is a need to provide IR and/or RF transmission capability to the game console 100, which is provided by the wireless adapters of the present invention.

Figure 13:
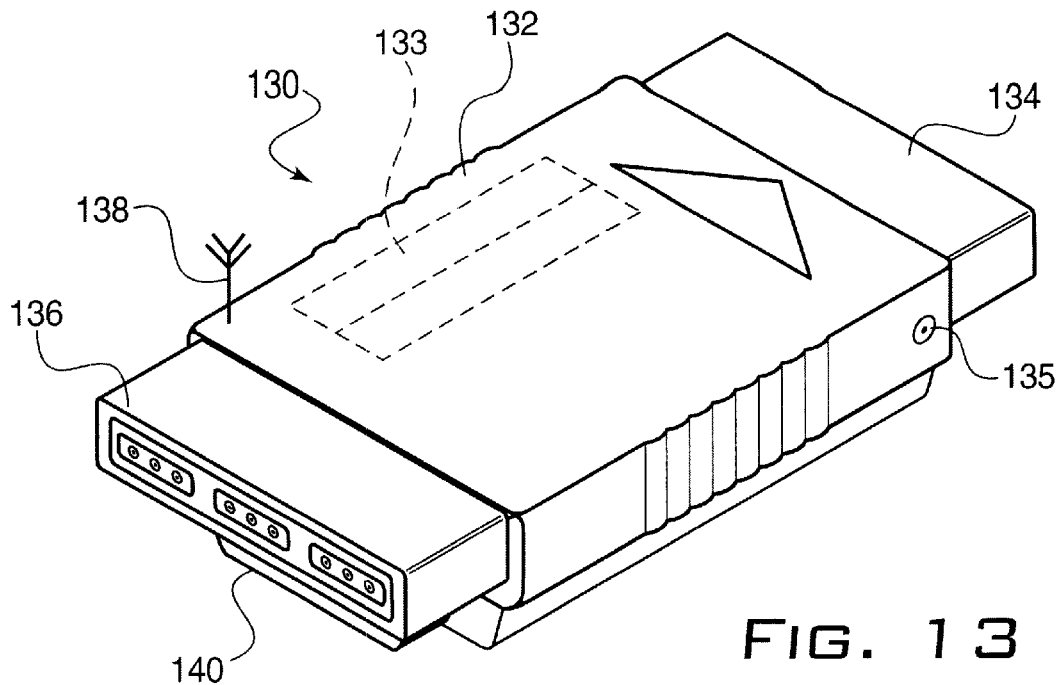
FIG. 13 is a perspective view of an alternative console interface according to an embodiment of the invention.
Figure 14:
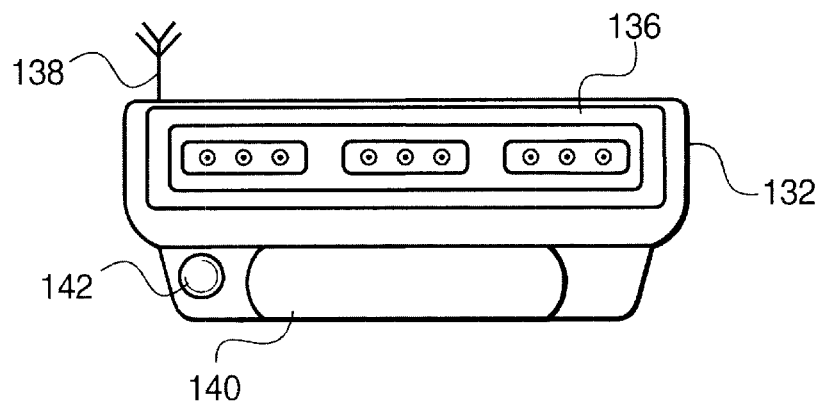
FIG. 14 is an end view of the console interface according to the embodiment depicted in FIG. 13.
Figure 15:
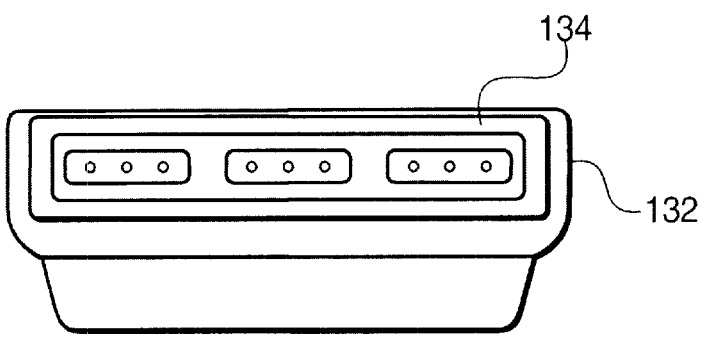
FIG. 15 is an opposing end view of the console interface according to the embodiment depicted in FIG. 13.
Figure 16:
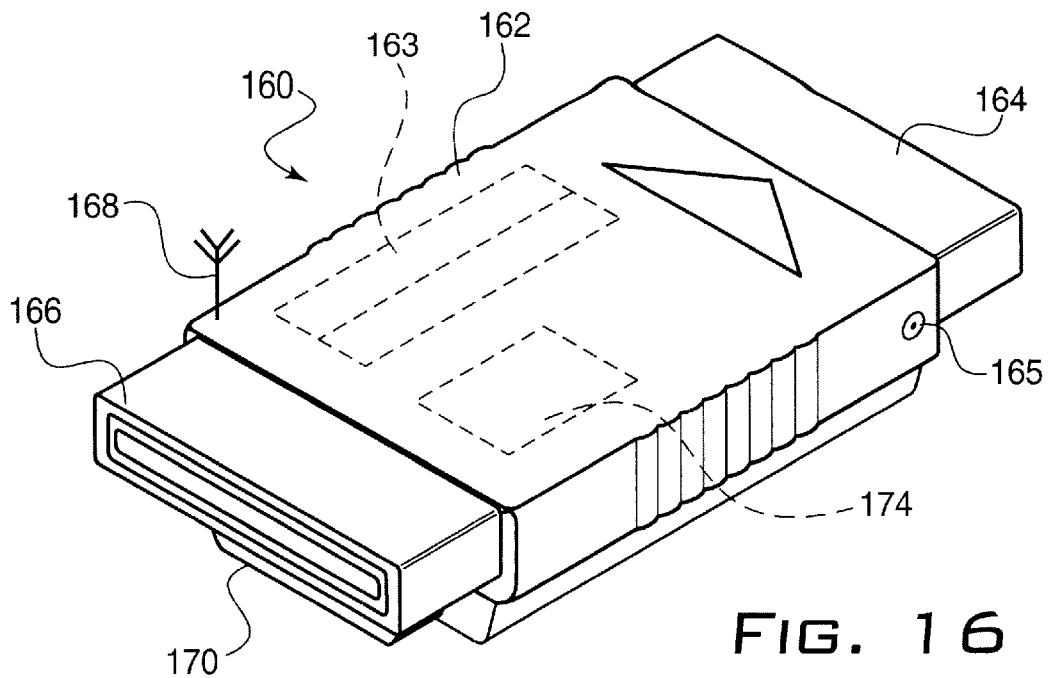
FIG. 16 is a perspective view of the console interface according to another embodiment of the invention.
Figure 17:
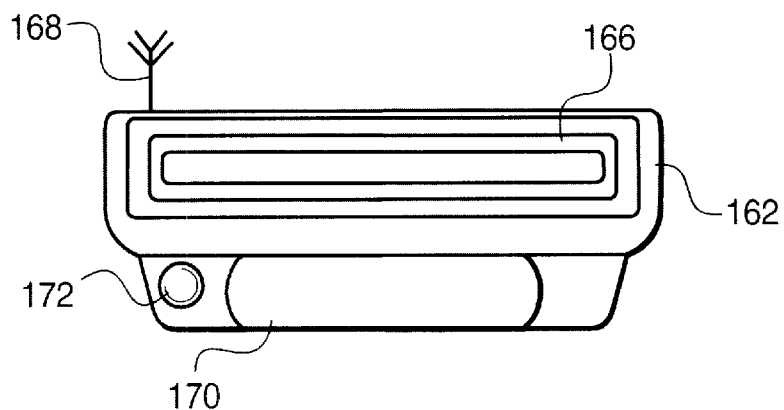
FIG. 17 is an end view of the console interface according to the embodiment depicted in FIG. 16.
Figure 18:
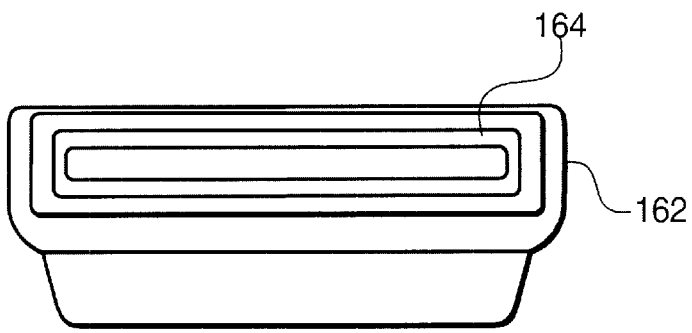
FIG. 18 is an opposing end view of the console interface according to the embodiment depicted in FIG. 16.

FIGS. 13–22 show various different embodiments of a console interface/wireless adapter according to the invention. Referring to FIGS. 13–15, there is shown a wireless adapter/ receiver 130 according to one embodiment of the present invention. Adapter 130 includes a housing 132, a male plug 134 on one end for connection to one of the game controller ports 108a or 108b of a game console 100 (FIG. 12) and an infrared (IR) receiver/transmitter portion 140 opposite plug 134. In addition, adapter 130 includes a radio frequency (RF) antenna 128 and corresponding RF circuitry so that adapter 130 can be used with RF or a combination of IR and RF technology (to be discussed later). An indicator light 142 is included for indicating when adapter 130 is receiving or transmitting information via IR or RF from or to the game controller.

In one embodiment, adapter 130 converts the game controller port 108a or 108b of a video game console into an IR receiver/transmitter capable of receiving and inputting control commands into the game console and transmitting control commands to the controller such as, for example, commands to provide feedback to the game controller, for example, to control an internal vibration member (e.g., internal rumble pack). In this embodiment, when adapter/receiver 130 is in its operable position within the game controller port 108a or 108b, the used game controller port is no longer available for use with a game controller. However, in accordance with a preferred embodiment, adapter 130 includes an additional female game port 136 that effectively provides the user with another game controller port for connecting a wired game controller or other accessory items to the game console while adapter 130 is in its operable position within the game controller port 108a or 108b.

In another embodiment, console 100 includes IR window 116 and corresponding circuitry for receiving IR commands from and to the wireless controller. As such, adapter 130 will provide IR transmission capability to the console and enable the console to wirelessly transmit control commands to the game controller. Again, these control commands can include, but are not limited to, programming/configuration commands and feedback commands for controlling internal elements of the game controller, such as an internal vibration member.

Console 100 may also include and RF antenna 118 and corresponding circuitry for receiving RF signals. As such, the wireless adapter 130 can be used to send either IR or RF signals to the controller and the controller can send RF signals directly back to the console.

In accordance with other embodiments of the invention, the console interface or wireless adapter can be operably disposed within any one of the communication ports of the game console. For example, referring to FIGS. 16–18, there is shown an embodiment of the wireless adapter 160 having a housing 162 and a plug end 164 adapted to be inserted into one of the memory slots 110a or 110b of the game console 100 (FIG. 12). Wireless adapter 160 also includes the IR communication means 170 along with the RF antenna 168 and corresponding RF circuitry to enable the use of RF, IR or a combination of both. An additional memory slot or plug 166 may also be included to provide the user with the ability to add memory as desired. In yet another embodiment, adapter 170 includes an internal memory 174 of variable size. The inclusion of an internal memory 174 would enable the elimination of the additional memory slot 166 and provide adapter 170 with the additional functionality of adding memory to the system while enabling the wireless communication with the game controller.

Figure 19:
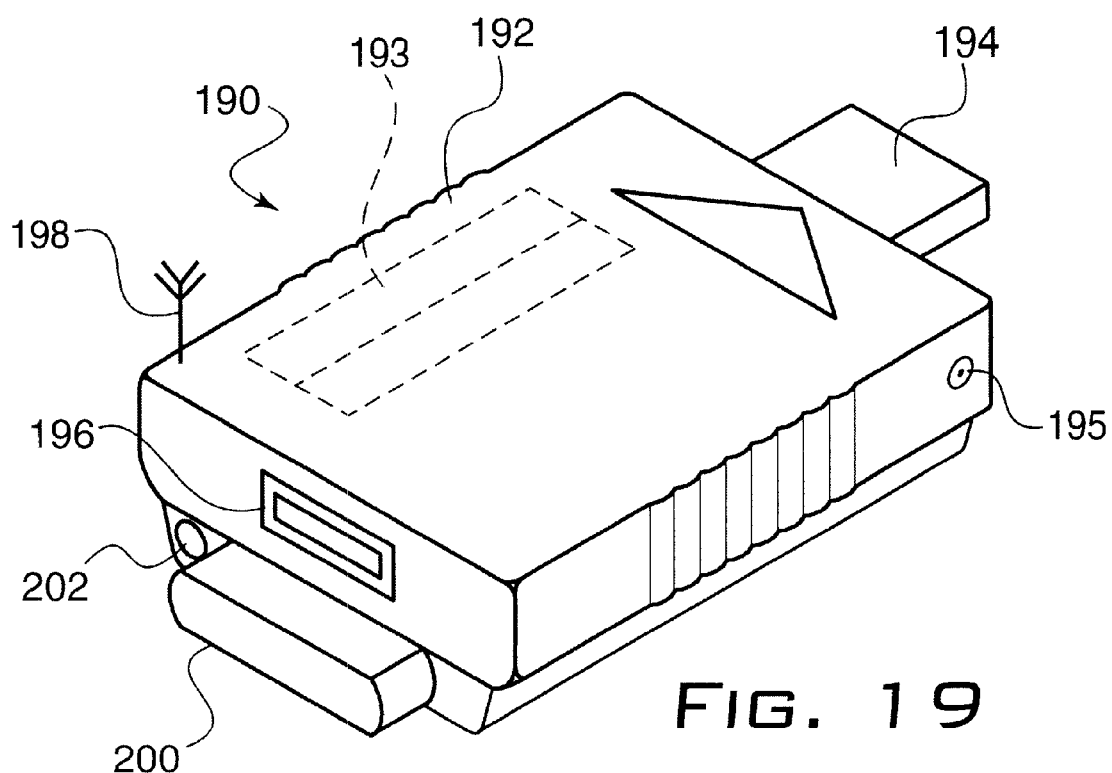
FIG. 19 is a perspective view of the console interface according to another embodiment of the invention.
Figure 20:
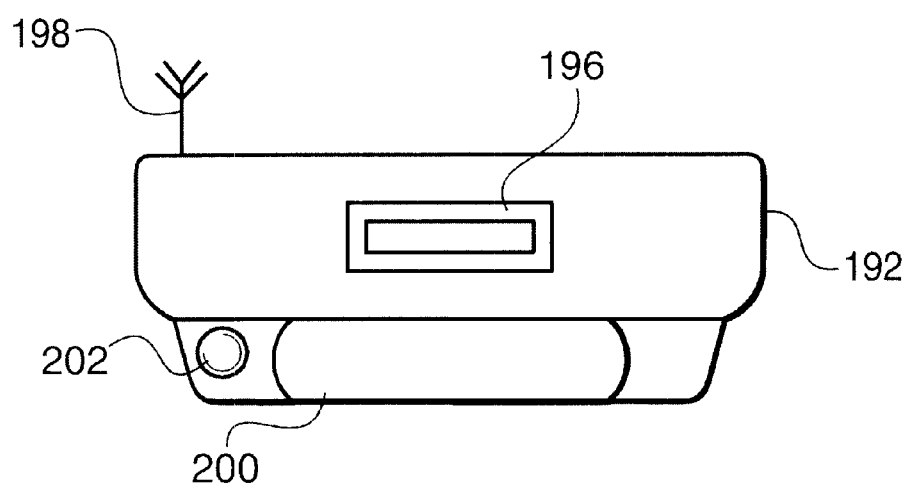
FIG. 20 is an end view of the embodiment of the console interface depicted in FIG. 19.

FIGS. 19–20 show another embodiment of the adapter 190 having a housing 192 and a male plug end 194 adapted to be inserted into one of the USB ports 112a, 112b of the game console 100 (FIG. 12) and an infrared (IR) receiver/transmitter portion 200 opposite plug 194. In addition, adapter 190 includes a radio frequency (RF) antenna 198 so that adapter 190 can be used with IR, RF or a combination of both IR and RF technology (to be discussed later). An indicator light 202 is included for indicating when adapter 190 is receiving or transmitting information via IR or RF from or to the game controller. According to a preferred embodiment, a female USB receptacle 196 is included on adapter 190 so as to provide the user with another USB port while adapter 190 is using one of the USB ports 112a or 122b of the game console.

Figure 21:
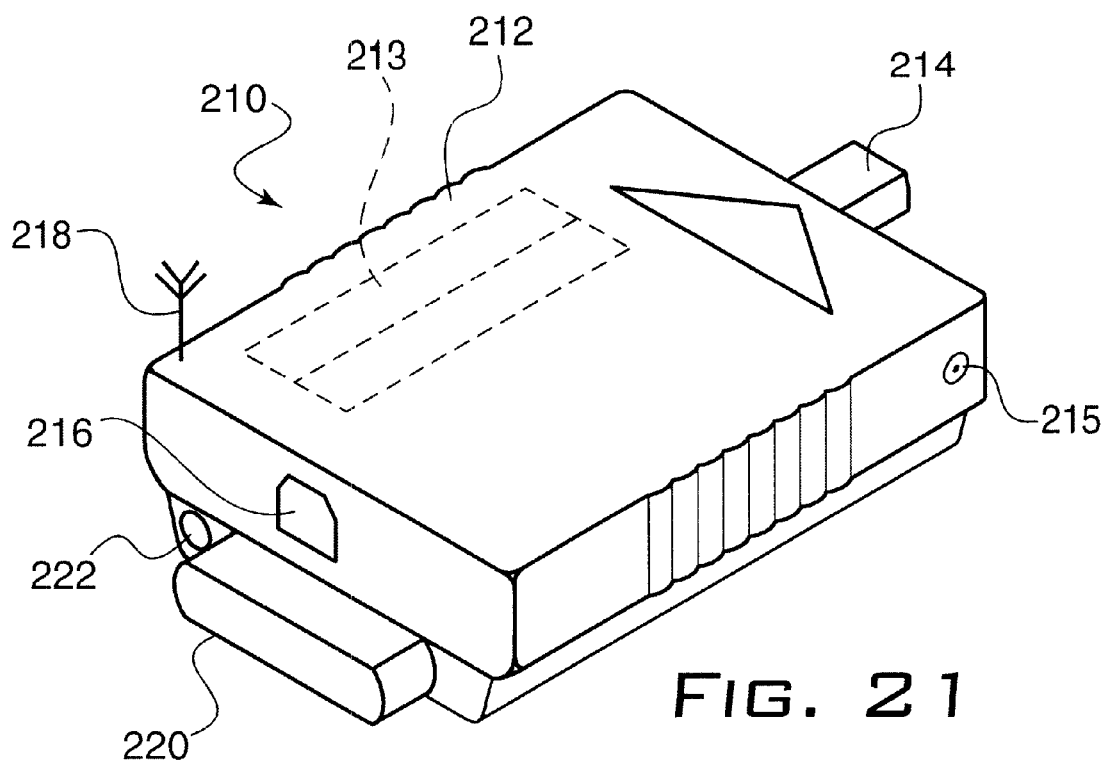
FIG. 21 is a perspective view of the console interface according to yet another embodiment of the invention.
Figure 22:
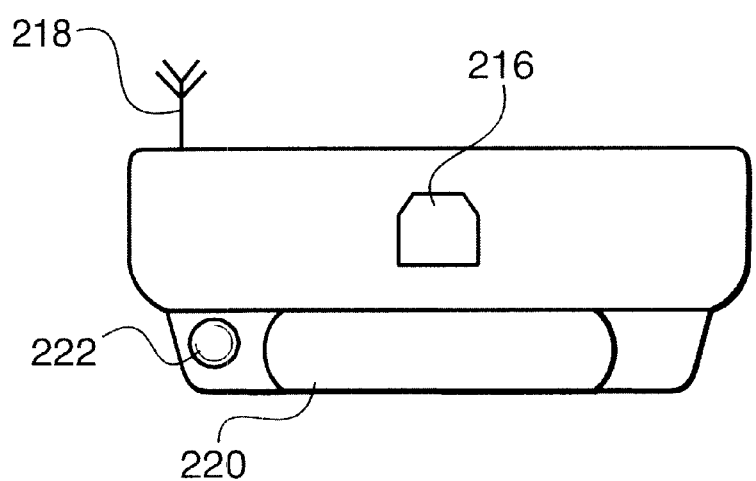
FIG. 22 is an end view of the console interface depicted in FIG. 21.

FIGS. 21–22 show another embodiment of the adapter 210 having a housing 212 and a male plug end 214 adapted to be inserted into the IEEE 1394 FireWire™ port 114 of the game console 100 (FIG. 12) and an infrared (IR) receiver/transmitter portion 220 opposite plug 214. In addition, adapter 210 includes a radio frequency (RF) antenna 218 so that adapter 210 can be used with IR, RF or a combination of both IR and RF technology (to be discussed later). An indicator light 222 is included for indicating when adapter 210 is receiving or transmitting information via IR or RF from or to the game controller. According to another preferred embodiment, a female IEEE 1394 FireWire™ receptacle 216 is also included on adapter 210 so as to provide the user with another IEEE 1394 FireWire™ port while adapter 210 is using the IEEE 1394 FireWire™ 114 of the game console.

In each of the above described embodiments, RF antennae 138, 168, 198 and 218 are shown disposed external to their respective housings. Those of skill in the art understand that these antennae may be internally disposed in their respective housings so as to eliminate the possibility of accidental breaking or damage during handling.

As mentioned, it is contemplated herein to utilize a combination of IR and RF technology in order to effect the most efficient and cost effective wireless communication between the console 100 and the game controllers. Those of skill in the art will recognize that the use of each technology (i.e., IR and RF) comes with their own advantages and disadvantages. For example, IR is generally the wireless method of choice because it is cheaper to implement than RF, and therefore is suitable for keeping products costs down during manufacturing and subsequent sale prices low. However, those of skill in the art will appreciate the "line of sight" limitation associated with IR. This limitation requires a clear line of sight between the game controller and the game console. Without a clear line of sight, the IR wireless commands cannot reliably be received by the IR receiver. Radio frequency (RF), on the other hand, has proven most reliable in a wireless gaming and remote control environments, however it is generally more expensive to implement and therefore is not desirable when attempting to keep product manufacturing costs and sale prices down. RF effectively eliminates the "line of sight" limitation on IR.

According to a preferred embodiment of the invention, wireless communication from the game controller to the console is performed using RF and wireless communication from the console to the game controller is performed using IR. Thus, the game controller includes an RF transmitter and an IR receiver, while the console interface (i.e., adapter of FIGS. 13–22) includes the RF receiver and the IR transmitter. As mentioned above, the IR transmitter may be included in the console and need not be included in the adapter. In this manner, the more reliable communication method (RF) is utilized for game playing, while the less reliable ("line of sight") IR is used for transmitting control commands to the game controller. Since the one way communication from the console to the game controller during game play is primarily to provide feedback to the game controller (e.g., through an internal vibration member 120—FIG. 2), the need for highly reliable communication in this direction is not as important as the need in the other direction (i.e., from the controller to the console). This is because if the game controller does not provide feedback to the user once in a while due to a line of sight failure of the IR transmission from the console, the user's ability to control the game is still not effected. Those of ordinary skill in the art will recognize that the combined use of RF and IR can be implemented in many different ways, including the reverse of the above description wherein RF is used for communication from the console to the controller and IR is used for communication from the controller to the console. Other possible implementations include the disposition of both RF and IR circuitry in the console and corresponding circuitry within the game controller.

Since the disclosed adapters 130, 160, 190 and 210 will all contain wireless transmitting capability in one form or another (i.e., IR , RF or both) it is necessary for these adapters to have power. In one embodiment, each adapter can obtain the power necessary for wireless transmitting from the game console via the corresponding male plug 134, 164, 194 and 214. In yet another contemplated embodiment, each adapter can have its own on board power supply. For example, each adapter 130, 160, 190 and 210 can have internal batteries 133, 163, 193 and 213, respectively, which provide the necessary power to the adapter. The batteries may be removable through the releasable removal of the adapter housing (e.g., by sliding) or may be rechargeable through the connection of an appropriate charger and a charging jack 135, 165, 195 and 215.

Those of ordinary skill in the art will recognize that the concepts described herein may been applied to various different types of game controllers without departing from the spirit of the invention. These different types of game controllers include standard, enhanced, programmable and genre specific game controllers, such as, for example, racing controllers, fighting controllers, shooting controllers (e.g., first person shooter), platform/adventure controller, flight simulator, motorcycle/bike controllers, pool cues, fishing, snow boards, golf, and baseball controllers.

It will be understood that various modifications can be made to the embodiments of the present application without departing from the spirit and scope thereof. For example, various types of game consoles executing various types of game programs and interacting with various video outputting apparatus may be used with the wireless control unit. Likewise, various memory cartridges and other peripheral devices may be used with the wireless control unit. Further, the wireless control unit may use other transmission techniques for transferring game information and/or controller information. Therefore, the above description should not be construed as limiting the invention, but merely as disclosing preferred embodiments thereof. Those skilled in the art will envision other modifications within the scope and spirit of the invention as defined by the claims appended hereto.

What is claimed is:

1. A wireless game control unit for converting a video game system having a game console with game controller ports and at least one memory slot and being adapted to operate with wired controllers into a system operable with wireless controllers, the wireless game control unit comprising:

a game controller having at least one user operable switch and wireless transmitter circuitry for transmitting game control information;

a wireless adapter connected to the game console via the at least one memory slot and having wireless receiver circuitry for receiving said game control information from said game controller; and wireless communication protocol for controlling the transmission and receiving of wireless signals between said controller and said wireless adapter.

2. The wireless game control unit according to claim 1, wherein said game controller further comprises wireless receiver circuitry for receiving controller information from the wireless adapter.

3. The wireless game control unit according to claim 2, wherein said wireless adapter further comprises wireless transmitting circuitry for transmitting said controller information to said controller.

4. The wireless game control unit according to claim 3, wherein said wireless adapter further comprises power supply means for supplying power to said wireless transmitter circuitry.

5. The wireless game control unit according to claim 4, wherein said power supply means comprises batteries contained within said wireless adapter.

6. The wireless game control unit according to claim 4, wherein said power supply means comprises circuitry for obtaining power from the game console via the at least one memory slot.

7. The wireless game control unit according to claim 2, further comprising a memory slot disposed on said wireless adapter for providing a user with access to the used memory slot while said wireless adapter is disposed in the at least one memory slot on the game console.

8. The wireless game control unit according to claim 2, wherein said wireless communication protocol comprises a combination of Infrared (IR) and Radio Frequency (RF), wherein said game control information is transmitted using RF and said controller information is transmitted using IR.

9. The wireless game control unit according to claim 2, wherein said wireless communication protocol comprises a combination of Infrared (IR) and Radio Frequency (RF), wherein said game control information is transmitted using IR and said controller information is transmitted using RF.

10. The wireless game control unit according to claim 2, wherein said game controller comprises an internal vibration member, said controller information including signals for selectively activating said internal vibration member in response to action within a game being played.

11. The wireless game control unit according to claim 2, wherein the game control information includes an auto activate start signal, and said wireless adapter modifies the game control information so that an activate signal is continuously sent from the adapter to the game console via the memory slot, wherein at least one object in a game being played with the video game console is continuously activated.

12. The wireless game control unit according to claim 2, wherein said wireless adapter further comprises an internal memory for providing a user with expansion memory features for the game console.

13. The wireless game control unit according to claim 1, wherein said game controller comprises genre specific game controller selected from a group consisting of racing, fighting, shooting, platform/adventure, flight simulator, motorcycle/bike, pool cue, fishing, snow board, golf and baseball controllers.

14. The wireless game control unit according to claim 1, wherein said wireless adapter further comprises memory slot adapted to receive a memory card for expanding memory capabilities of the game console.

15. A wireless game control unit for a video game system having a game console, the game console having game controller ports and at least one memory slot, and an infrared (IR) receiver, the wireless game control unit comprising:
   a controller having at least one user operable switch and wireless transmitter circuitry for transmitting game control information and wireless receiver circuitry for receiving controller information;
   a wireless adapter connected to the game console via the at least one memory slot and having wireless transmitter circuitry for transmitting the controller information to said controller; and
   wireless communication protocol for controlling the transmission of wireless signals by said controller and said wireless adapter.

16. The wireless game control unit according to claim 15, wherein said wireless communication protocol comprises IR transmission from said controller to the game console and radio frequency (RF) transmission from said wireless adapter to said controller.

17. The wireless game control unit according to claim 15, wherein said wireless communication protocol comprises IR transmission from said controller to the IR receiver in the game console and IR transmission from said wireless adapter to said controller.

18. The wireless game control unit according to claim 15, further comprising a memory slot disposed on said wireless adapter for providing a user with access to the used memory slot while said wireless adapter is disposed in the at least one memory slot on the game console.

19. The wireless game control unit according to claim 15, wherein said wireless adapter further comprises an internal memory for providing a user with expansion memory features for the game console.

20. The wireless game control unit according to claim 15, further comprising power supply means for supplying power to said wireless transmitter circuitry.

21. The wireless game control unit according to claim 20, wherein said power supply means comprises batteries contained within said wireless adapter.

22. The wireless game control unit according to claim 20, wherein said power supply means comprises circuitry for obtaining power from the game console via the at least one USB port.

23. The wireless game control unit according to claim 15, wherein said controller comprises an internal vibration member, said controller information including signals for selectively activating said internal vibration member in response to action within a game being played.

24. The wireless game control unit according to claim 15, wherein the game control information includes an auto activate start signal, and said wireless adapter modifies the game control information so that an activate signal is continuously sent from the wireless adapter to the game console via the USB port, wherein at least one object in a game being played with the video game console is continuously activated.

25. The wireless game control unit according to claim 15, wherein said controller comprises genre specific game controller selected from a group consisting of racing, fighting, shooting, platform/adventure, flight simulator and motorcycle/bike, pool cues, fishing, snow boards, golf and baseball controllers.

26. The wireless game control unit according to claim 15, wherein said wireless adapter further comprises memory slot adapted to receive a memory card for expanding memory capabilities of the game console.

27. A wireless game control unit for a video game system having a game console, the game console having game controller ports, at least one memory slot and a radio frequency (RF) receiver, the wireless game control unit comprising:
   a controller having at least one user operable switch and wireless transmitter circuitry for transmitting game control information and wireless receiver circuitry for receiving controller information;
   a wireless adapter connected to the game console via the at least one memory slot and having wireless transmitter circuitry for transmitting the controller information to said controller; and
   wireless communication protocol for controlling the transmission of wireless signals by said controller and said wireless adapter.

28. The wireless game control unit according to claim 27, wherein said wireless communication protocol comprises RF transmission from said controller to the game console and radio frequency (RF) transmission from said wireless adapter to said controller.

29. The wireless game control unit according to claim 27, wherein said wireless communication protocol comprises RF transmission from said controller to the game console and IR transmission from said wireless adapter to said controller.

30. The wireless game control unit according to claim 27, further comprising an additional memory slot disposed on said wireless adapter for providing a user with access to the used memory slot while said wireless adapter is disposed in the at least one memory slot on the game console.

31. The wireless game control unit according to claim 27, wherein said wireless adapter further comprises memory slot adapted to receive a memory card for expanding memory capabilities of the game console.

* * * * *